United States Patent [19]

Becken et al.

[11] Patent Number: 4,981,388
[45] Date of Patent: Jan. 1, 1991

[54] TIMBER JOINING SYSTEM

[75] Inventors: Richard H. Becken, Windsor; Peter J. Ferick, Brownsville, both of Vt.

[73] Assignee: Green-Mountain Precision Frames, Inc., Windsor, Vt.

[21] Appl. No.: 339,643

[22] Filed: Apr. 17, 1989

[51] Int. Cl.$^5$ .............................. B25G 3/00; F16B 9/00
[52] U.S. Cl. .................................... 403/258; 403/382; 403/403
[58] Field of Search ...................... 403/231, 382, 407.1, 403/406.1, 405.1, 403, 258, 260

[56] References Cited

U.S. PATENT DOCUMENTS

| 470,995 | 3/1892 | Duchemin | 403/231 X |
| 4,012,153 | 3/1977 | Pidgeon et al. | 403/231 X |
| 4,261,665 | 4/1981 | Hsiung | 403/260 X |

FOREIGN PATENT DOCUMENTS

| 3401698 | 8/1985 | Fed. Rep. of Germany | 403/231 |
| 1007385 | 5/1952 | France | 403/231 |
| 223247 | 11/1942 | Switzerland | 403/258 |

Primary Examiner—Andrew V. Kundrat
Attorney, Agent, or Firm—Wolf, Greenfield & Sacks

[57] ABSTRACT

The improved joinery system provides a concealed means for connecting two or more wooden members at a variety of angles.

Each connection consists of a short tenon on one member being inserted into a shallow mortise in the second member and having a bolt passing through one member into the second member where it threads into an anchor nut. The anchor nut is a metal rod with one or more threaded holes for bolt insertion. The anchor nut is held in place within the member in correct alignment by means of a pressed in sleeve through which the bolt passes when inserted to complete the connection. Wooden plugs may be used to fill anchor nut and bolt counterbores to fully conceal fastening hardware.

A Belleville disc springs may be used btween bolt head and flat washer to maintain joint tightness during wood shrinkage.

18 Claims, 3 Drawing Sheets

TIMBER JOINING SYSTEM

BACKGROUND OF THE INVENTION

Mortise and tenon joints are well known for many applications. The traditional joint used in timber construction uses wooden pegs to hold the tenon in the mortise. Joints are assembled by forcing the two members together, drilling a peg hole, and inserting the peg. In order to design for tension and shear loads, the depth and length of the tenon is relatively large in proportion to the beam size. This requires therefore a large mortise. This adversely affects the strength of the mortised beam and limits the number of joints at one location.

Many types of steel connectors are available to hold timbers together with bolts or screws. These are normally external and as such are often unattractive and prone to early failure during fire.

SUMMARY OF THE INVENTION

It is the object of the invention to provide an improved timber joint.

It is another object of the invention to provide a joining system which will allow for two or more members in one plane to be joined in a common member with minimum structural weakening of that member due to removal of material.

It is another object of the invention to provide a simple means to draw joints together thereby simplifing the erection process and resulting in very tight joints.

It is another object of the invention to provide a means to secure an anchor nut within one member in the correct alignment for receiving the combining bolt through the second member.

A further object of the invention is to provide a means of maintaining joint tightness during wood shrinkage.

These and other objects which will become apparent from the following specification are accomplished by the invention.

The invention provides for a method of joining two or more beams by the combination of a mortise and tenon subsystem with a mechanical fastening subsystem to hold the joint together.

A relatively short tenon is cut on the end of one member and a similarily sized mortise is cut into the receiving member The mortise and tenon are sized to accomodate the load requirements for shear and bearing. The mortise and tenon locates the joint and also provides anti-rotational rigidity.

The mechanical fastening system consists of a bolt, washer, disc spring, and anchor nut assembly. The bolt passes through a hole bored through one member with the bolt head, disc spring, and washer seated in a larger counterbore. The anchor nut is a solid metal rod with one or more holes threaded for bolt insertion. The anchor nut is located in a hole bored in the second member. The second member also has a bolt bore which intersects the anchor nut bore. A sleeve is pressed into a recess in the anchor nut through the bolt bore thereby aligning the threaded hole in the anchor nut with the bolt bore. This also holds the anchor nut captive within the timber. Joint assembly consists of inserting the tenon into the mortise, inserting the bolt with washer and disc spring, and then tightening the bolt to draw the joint together.

Two opposing members may be connected to a common third member with a single anchor nut by providing two threaded holes in the anchor nut at the appropriate angle.

These two preferred embodiments are shown by way of example in the detailed description and do not attempt to show all the various modifications in which the invention might be embodied; the invention being measured by the appended claims.

DETAILED DESCRIPTION OF THE PREFERRED EMBODIMENTS

Figure 1:
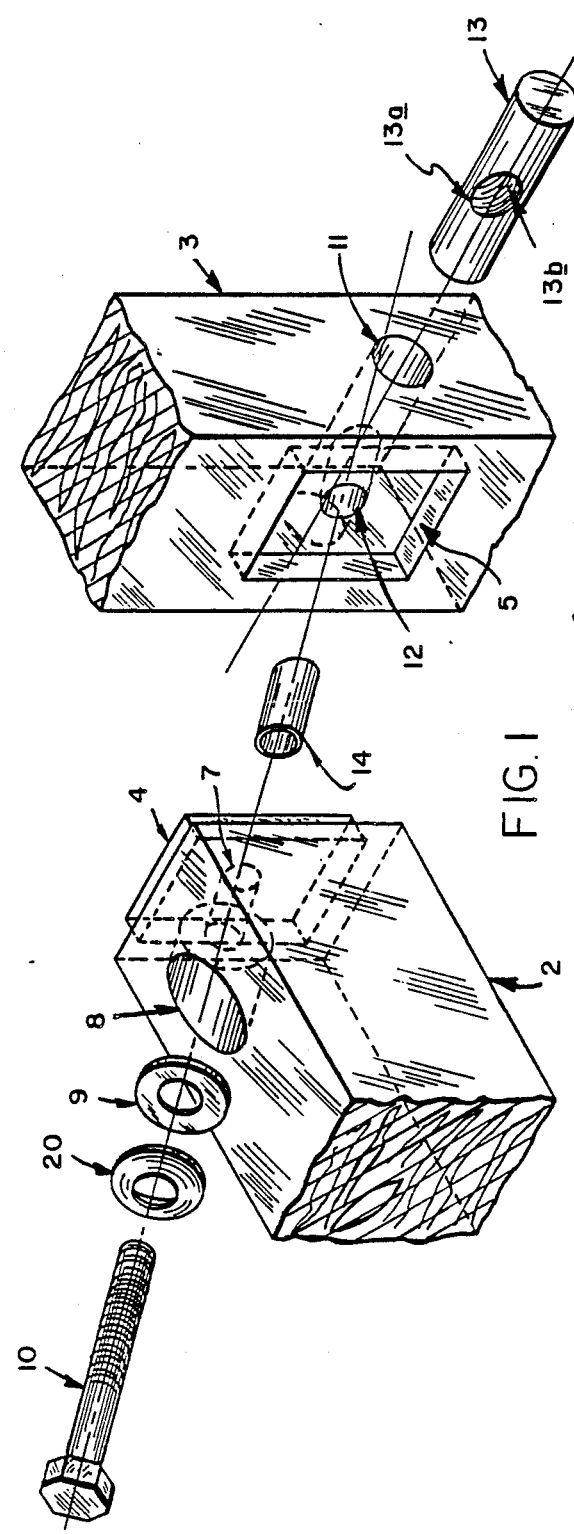
FIG. 1 is an exploded perspective of the improved timber joint joining two members together.
Figure 2:
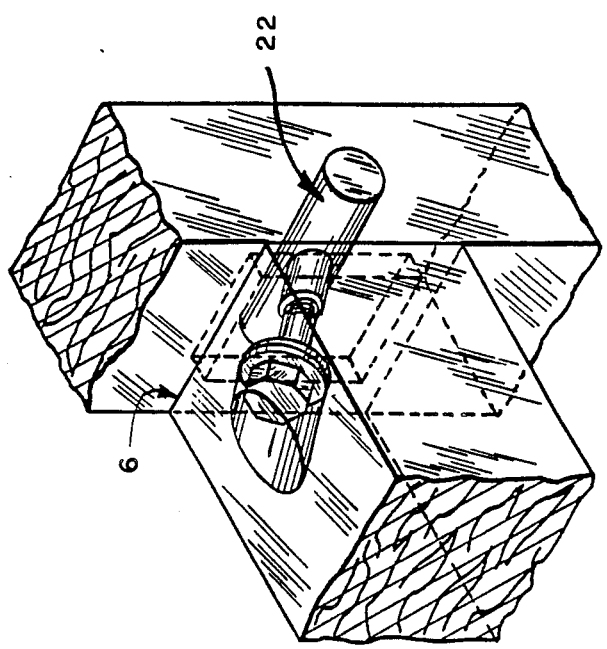
FIG. 2 is the same joint as FIG. 1, but assembled, showing location of bolt and anchor nut.

Referring to FIGS. 1 and 2, a timber joint is shown combining two wooden members 2 and 3. The end of one beam 2, has had a short tenon 4 cut into it. The tenon dimensions are typically 90% of beam width and depth. Tenon length is typically substantially shorter than depth, and is determined by load bearing requirements and compressive strength of the material. The second beam 3 has a mortise 5 the same dimension as the tenon 4, except the length of the tenon is less than the depth of the mortise. This slight clearance allows for the complete seating of the tenoned beam 2 against the mortised beam 3 at the interface 6.

A bolt hole 7 is bored through the beam 2 starting at the end of the tenon 4 and continuing at an angle out through the side of the beam. This hole is counterbored 8 at that end to accept a washer 9, disc spring 20, and bolt 10. A hole 11, for the anchor nut 13, is bored in the second beam 3 in a side 90° to the side the mortise 5 is on. Another hole 12 is bored through the mortise 5 to intersect with the anchor nut bore 11. This hole 12 is a bolt hole. The bolt bores 7 and 12, in both beams 2 and 3, are located so that when the tenon 4 is seated in the mortise 5, they are in alignment.

The anchor nut 13 is a metal rod with a threaded hole 13b passing through the diameter. The anchor nut 13 also has a recess 13a, larger than and concentric to the threaded hole 13b for acceptance of a sleeve 14. The anchor nut 13 is inserted into the bore 11 so the recess 13a and threaded hole 13b are aligned with the bolt bore 12. The sleeve 14 is then inserted through the bolt bore 12 and pressed into the anchor nut recess 13a. The press fit between these two components locks the anchor nut assembly 22, within the timber and aligns the threaded hole 13b with the bolt bore 12.

Installation of the anchor nut 13 and sleeve 14 is done prior to frame assembly. During erection, the procedure to complete the joint is to seat the tenon 4 into the mortise 5, insert the bolt 10 through disc spring 20 and washer 9 into the combined bolt bore 7 and 12, and thread the bolt 10 into the anchor nut assembly 22. Tightening the bolt 10 completes the joint providing a very tight fit at the interface 6. Wooden plugs may be fit into anchor nut bore 11 or counterbore 8 to fully conceal the fastening hardware.

Figure 3:
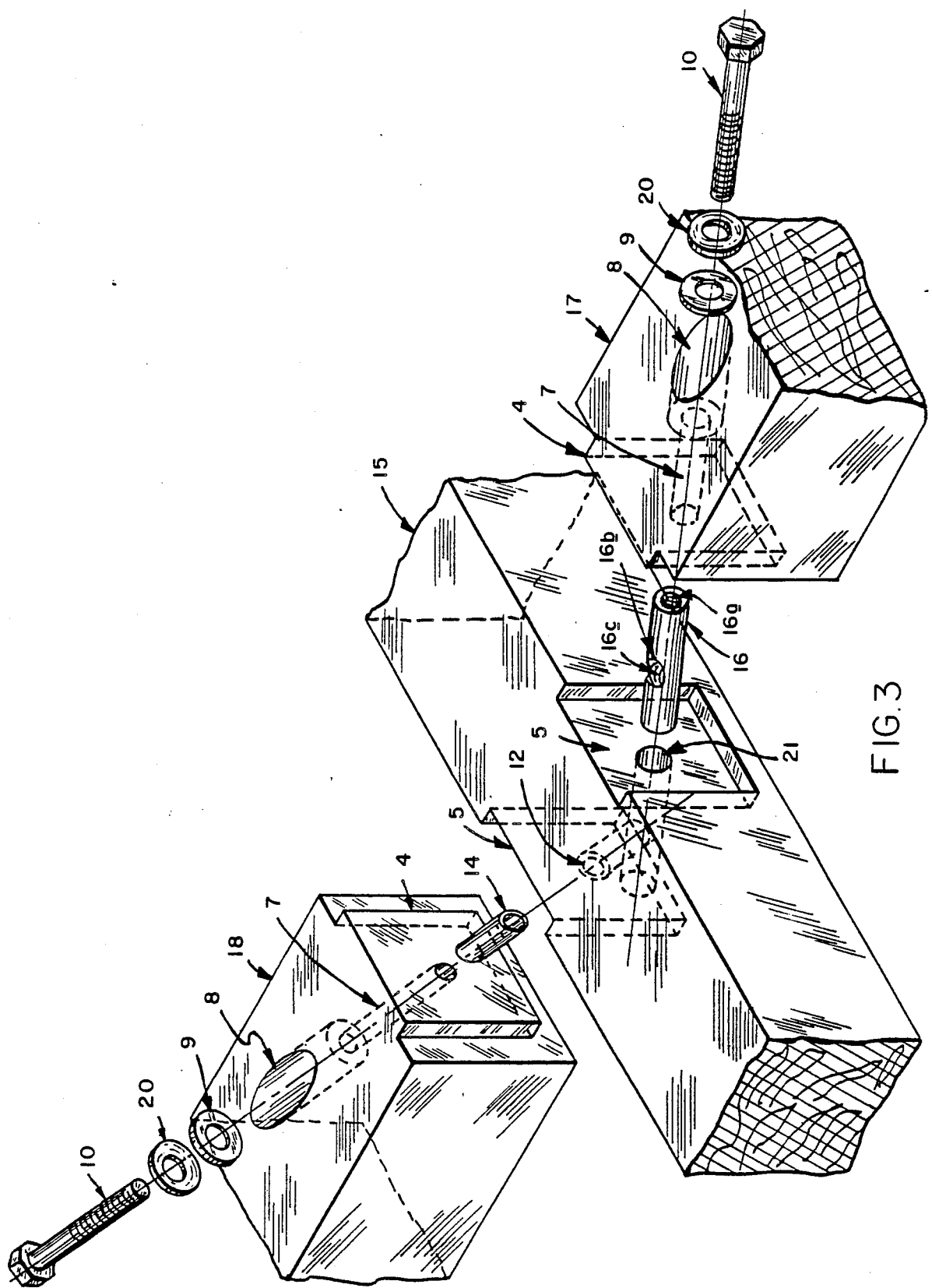
FIG. 3 is an exploded perspective of the improved timber joint combining three members.
Figure 4:
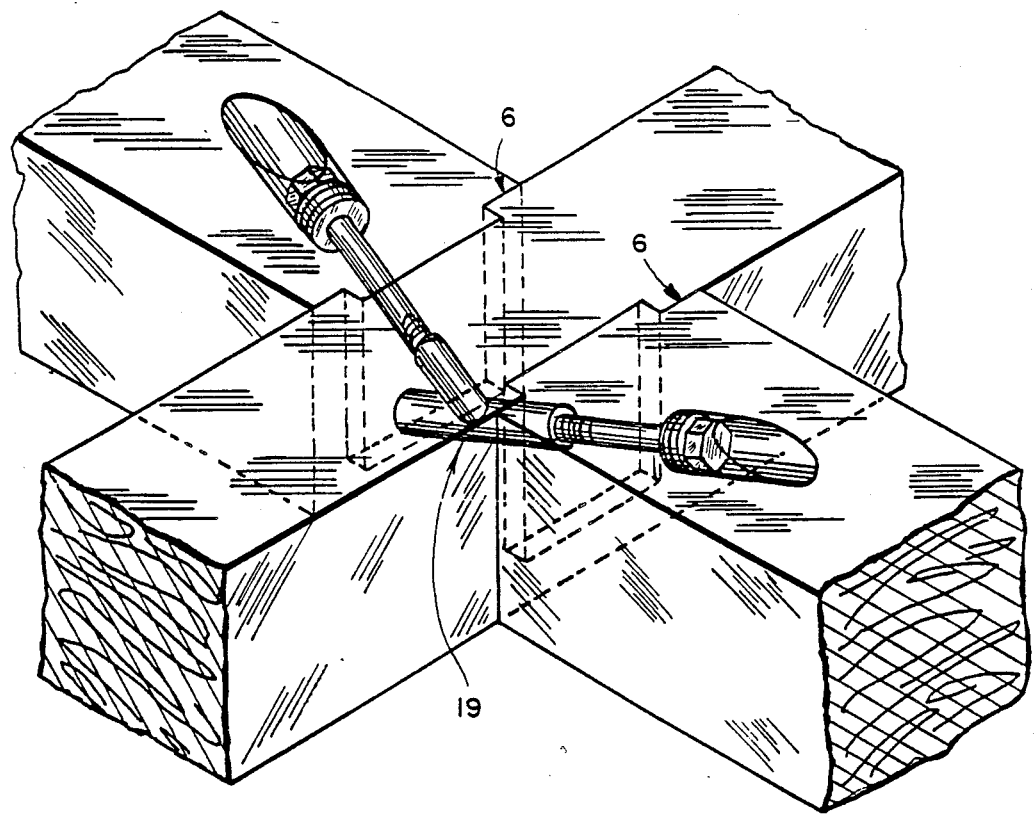
FIG. 4 is the same joint as in FIG. 3, but assembled, showing location of bolts and anchor nut.

A second embodiment is referred to in FIGS. 3 and 4. Three beams 15, 17, and 18, are joined together using two bolts 10 and one common anchor nut 16. The two beams 17 and 18, are prepared as beam 2 in FIG. 1 with tenon 4 and bolt bores 7 and 8. The third, common member 15 has mortises cut on opposite sides. A hole 21 is bored in one mortise to accept the anchor nut 16 at the same angle and alignment as the bolt bore 7 in the tenoned beam 17. Similarly, a hole 12 is bored through the opposite mortise to accept the bolt 10 from beam 18. The anchor nut 16 has a threaded hole 16a in one end to receive the bolt 10 from the attaching beam 17. The anchor nut 16 also has a threaded hole 16c through the diameter at an angle so that it is aligned with the intersecting bolt bore 12. A recess 16b is machined into the anchor nut 16 concentric to and at the same angle as the threaded hole 16c. The recess 16b allows for the insertion of the pressed in sleeve 14.

When the anchor nut 16 is inserted into the bore 21 and sleeve 14 is press fit into the anchor nut recess 16b through the bolt bore 12, the anchor nut assembly 16 is locked in place within the timber in correct alignment to receive bolts 10.

Completion of the joint involves insertion of the tenons 4 into the mortises 5, followed by insertion of bolts 10 with disc springs 20 and washers 9 through bores 7 into the anchor nut threaded holes 16a and 16c. Tightening of the bolts 10 provides for a very tight joint at the interfaces 6. Installation of wooden plugs into counterbores 8 conceals fastening hardware.

Bolt tightness is maintained throughout changes in timber dimensions due to changes in moisture content by the inclusion of Belleville disc springs 20 between washer 9 and head of the bolt 10. Disc springs are selected singly or in multiples to allow for total range of travel necessary during shrinkage and of correct load range for the specific application.

The invention therefore provides a means to produce an improved timber joint.

The invention solves the problem of loss of strength due to material removal associated with traditional mortise and tenon joints when multiple members in one plane are connected to a common member.

The invention provides a means to permanently install an anchor nut in correct alignment in one member and allows for assembly and disassembly simply and without damage.

The invention further provides a means for drawing joininq members together very tightly as a part of the joining system itself.

What is claimed is:

1. Means for joining wooden members having a tenon on one member engaging a mortise formed in a second member comprising,
   a pair of intersecting bore holes located respectively one in each member, an anchor nut having a threaded hole extending axially inwardly from an annular shoulder formed in the side of said nut with said nut positioned in one bore hole with the shoulder axially aligned with the other bore hole, a sleeve at one end of said other bore hole with one end engaging said shoulder, and a bolt in said other bore hole extending through said sleeve and engaging said threaded hole.

2. Means for joining wooden members as recited in claim 1, further comprising a counterbore at the other end of said other bore hole, said bolt having a washer positioned adjacent the head of said bolt and seated in said counterbore.

3. Means for joining wooden members, as recited in claim 2, further comprising a disk spring between the head of said bolt and said washer.

4. Means for joining wooden members, as recited in claim 1, wherein said one bore hole is disposed in said second member and said other bore hole is disposed in said one member.

5. Means for joining wooden members, as recited in claim 1, wherein one end of said sleeve projects outwardly of said other bore hole into said one bore hole.

6. Means for joining wooden members as recited in claim 1, wherein said one bore hole and said other bore hole intersect one another orthoganally.

7. Means for joining wooden members as recited in claim 1, further comprising plugs positioned in said holes remote from the intersection thereof for concealing said one bore hole and said other bore hole.

8. Means for joining wooden members including a pair of first members engaging on opposite sides of a second member in which mortise and tenon members are formed on one each of said first and second members, comprising a pair of first bore holes one in each of said first members intersecting a second bore hole in said second member, an anchor nut having a pair of threaded holes extending therein with one of said threaded holes extending axially inward from an annular shoulder formed in the side of said nut and with said nut positioned in said second bore hole with the shoulder axially aligned with one of said first bore holes, a sleeve in said one of said first bore holes with one end engaging said shoulder, and a pair of bolts in each of said first bolt holes engaging said threaded holes.

9. Means for joining wooden members as recited in claim 8, wherein both of said threaded holes in said anchor nut are formed in the sides of of the said nut.

10. Means for joining wooden members as recited in claim 8, wherein said anchor nut has a rod-like shape and with the other of said threaded holes extends through an end of said nut parallel to a longitudinal axis.

11. Means for joining wooden members as recited in claim 8, further comprising a pair of counterbores, one each at an end of said first bore holes, and a pair of washers one each positioned adjacent a head of one of said first bolts and seated in said counterbores.

12. Means for joining wooden members, as recited in claim 11, further comprising disk springs disposed between each of said washers and said heads of said first bolts.

13. Means for joining wooden members having multiple dowel pins embedded in a first member and extending into holes formed in a second member comprising, a pair of intersecting bore holes located respectively one in each member, an anchor nut having a threaded hole extending axially inwardly from an annular shoulder formed in the side of said nut with said nut positioned in one bore hole with the shoulder axially aligned with the other bore hole, a sleeve at one end of said other bore hole with one end engaging said shoulder, and a bolt in said other bore hole extending through said sleeve and engaging said threaded hole.

14. Means for joining wooden members as recited in claim 13, wherein said pair of intersecting bore holes are located orthoganally to one another.

15. Means for joining wooden members as recited in claim 13, further comprising a counterbore at the other end of said other bore hole, and a washer positioned adjacent a head of said bolt, and seated in said counterbore.

16. Means for joining wooden members, as recited in claim 15, further comprising a disk spring disposed between said washer and said head of said bolt.

17. Means for joining wooden members, as recited in claim 13, wherein said one bore hole is formed in said second member and said other bore hole is formed in said one member.

18. Means for joining wooden members including a pair of first members engaging opposite sides of a second member in which mortise and tenon members are formed on one each of said first and second members, comprising, bore holes formed in each of said members with at least two of said bore holes in longitudinal alignment, an anchor nut positioned longitudinally in one of said bore holes having a pair of threaded holes formed in said nut with at least one of said bore holes extending at an acute angle to one of said members with at least one threaded hole formed in an end of said nut, and a bolt extending from the other of said bore holes into said one bore hole and into threaded engagement with one of said threaded holes.

* * * * *